United States Patent [19]
Garland et al.

[11] Patent Number: 5,544,045
[45] Date of Patent: Aug. 6, 1996

[54] UNIFIED SCANNER COMPUTER PRINTER

[75] Inventors: Harry Garland; Roger Melen, both of Los Altos Hills, Calif.

[73] Assignee: Canon Inc., Tokyo, Japan

[21] Appl. No.: 784,919

[22] Filed: Oct. 30, 1991

[51] Int. Cl.⁶ .................................................. G06F 17/24
[52] U.S. Cl. .................................. 364/419.03; 382/112
[58] Field of Search .................... 364/419; 340/825.3, 340/825.31, 825.34; 235/379, 375, 380, 437, 438; 382/61, 62, 57, 7; 358/453, 462, 78, 471

[56] References Cited

U.S. PATENT DOCUMENTS

| | | | |
|---|---|---|---|
| 3,787,660 | 1/1974 | Meyers et al. | 235/61.9 R |
| 3,903,517 | 9/1975 | Hafner | 340/324 AD |
| 3,999,852 | 12/1976 | Katayama | 355/26 |
| 4,068,212 | 1/1978 | Templeton | 340/146.3 ED |
| 4,110,025 | 8/1978 | Tabata | 355/3 |
| 4,283,621 | 8/1981 | Pembroke | 235/375 |
| 4,348,101 | 9/1982 | Schonfeld | 355/14 |
| 4,408,181 | 10/1983 | Nakayama | 382/61 |
| 4,437,127 | 3/1984 | Hirose | 358/296 |
| 4,495,521 | 1/1985 | Nagoh | 358/256 |
| 4,498,107 | 2/1985 | Yoshimaru et al. | 358/256 |
| 4,510,619 | 4/1985 | LeBrun et al. | 382/57 |
| 4,553,261 | 11/1985 | Froessl | 382/57 |
| 4,742,521 | 5/1988 | Nishida | 235/437 |
| 4,807,287 | 2/1989 | Tucker et al. | 340/825.34 |
| 4,813,077 | 3/1989 | Woods et al. | 235/379 |
| 4,860,226 | 8/1989 | Martin et al. | 235/437 |
| 4,862,386 | 8/1989 | Axelrod et al. | 364/518 |
| 4,890,230 | 12/1989 | Tanoshima et al. | 364/419 |
| 4,933,979 | 6/1990 | Suzuki et al. | 382/61 |
| 4,934,846 | 6/1990 | Gilham | 400/104 |
| 5,027,395 | 6/1991 | Anderson et al. | 380/4 |
| 5,075,895 | 12/1991 | Bessho | 382/61 |
| 5,133,024 | 7/1992 | Froessl | 382/44 |
| 5,185,665 | 2/1993 | Liston | 358/78 |

OTHER PUBLICATIONS

Graphica Development, Inc., "Form Scan" Datapro Accession No. 00259304.
Sostilio, R., "Multifunctionality: Where's the Market?," Dataquest Incorporated, 1989.
Seymour, J., "Enter the Scanner," PC Magazine, May 15, 1990, pp. 79–80.
Feder, B. J., "Xerox Unveils New Star," New York Times, Oct. 3, 1990.

*Primary Examiner*—Gail O. Hayes
*Assistant Examiner*—Frantzy Poinvil
*Attorney, Agent, or Firm*—Edward J. Radlo; Elizabeth F. Enayati

[57] ABSTRACT

A scanner (12), computer (2), and printer (13) are preferably combined within a single housing (1). The scanner (12) optically scans an input paper document (11) into a storage buffer (22) within the computer (2). The scanned information (22) is edited by automatic means (21), human-activated means (23, 3), or some combination thereof. The edited information is printed by the printer (13) onto the original input paper document (11). A single preferably linear paper transport mechanism (4) is used to move the document (11) through the scanner (12) and the printer (13). An authentication code (14, 16) may be superimposed onto the document (11) to prevent the unauthorized editing thereof.

14 Claims, 2 Drawing Sheets

UNIFIED SCANNER COMPUTER PRINTER

TECHNICAL FIELD

This invention pertains to the field of optically scanning a paper document, editing the scanned document, and printing the edited information onto the original document.

DISCLOSURE OF INVENTION

A unified scanner (12), computer (2), and printer (13). The apparatus comprises means (12) for optically scanning an input paper document (11) into a storage buffer (22) within the computer (2). Coupled to the storage buffer (22) is means (21, 23, 3) for editing the scanned paper document (22). Coupled to the computer (2) is means (13) for printing the edited document (22) onto the original input paper document (11).

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

One of the fundamental purposes of the present invention is to simplify the editing of documents 11. It is often desirable to supplement or edit information that is on a preprinted form 11 or a partially completed document 11, using modern day computers 2, such as word processors. It is highly desirable in many applications to have the ability to edit the information on the input document 11 itself, i.e., the output document is the input document 11. This saves paper and time, and avoids confusion. Some of these applications are: 1) general document automated annotation, such as date and time stamping; 2) precision printing of documents registered to the document edges; 3) narrowcasting of lithographed newsletters; and 4) filling out standardized questionnaires, government forms, and business forms.

Figure 1:
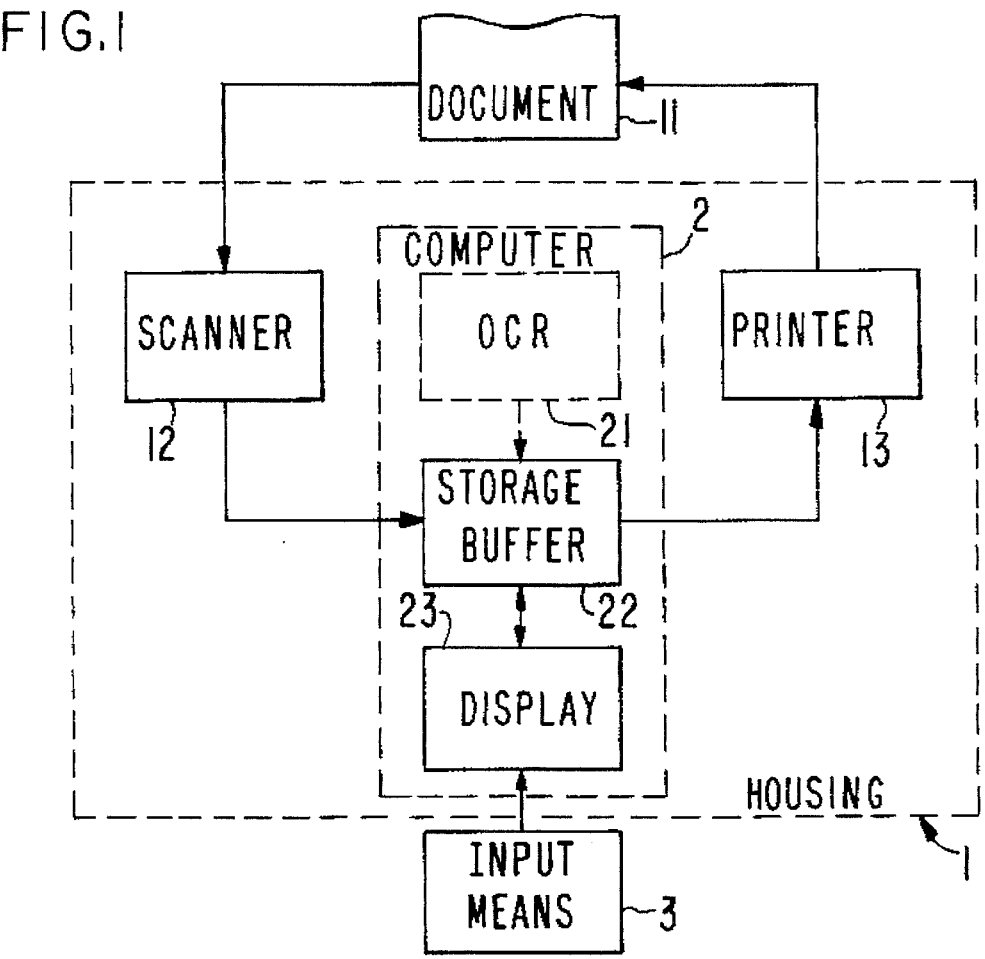
FIG. 1 is a schematic block diagram of the present invention.

FIG. 1 is a schematic block diagram of the present invention. An optical scanner 12 converts written, printed, digital, and/or graphical information that appears on input document 11 into an electronic digital form, such as a bit map, and stores this information into a storage buffer 22 within a computer 2. The information within buffer 22 is then edited by human means, automatic means, or some combination thereof. An example of human editing means is the combination of a display 23, such as a CRT or LCD, which normally includes associated storage registers, and an input device 3. Input device 3 may be a keyboard, mouse, electronic pen, etc., or a combination thereof.

Information from within buffer 22 is portrayed on display 23, showing all the instruction text, blocks for addresses, boxes to be checked, arrows, letterheads, seals, and related graphics. The image on display 23 is preferably made to look exactly like the original document 11. The human operator edits this information by activating input device 3. The operator scrolls (and pans) the display 23 image, stopping at each blank region to be completed. In the case where input means 3 is a keyboard, the operator places the cursor in the blank region and enters ASCII text from keyboard 3. The entered ASCII text is immediately displayed in the blank region, and may be changed or deleted using word processor editing features of computer 2. The operator can see the visible relationship between entered text and the original form on display 23. The operator can easily center the entered ASCII text up-right and left-down. Graphics information may be entered using a mouse 3 or electronic pen 3, and appropriate software.

When the operator is satisfied with the edits, he issues a command to computer 2 to restore the edited information from display 23 back into storage buffer 22. Another command is then issued to printer 13 to print the edited information from storage buffer 22. Alternatively, printer 13 can print directly from the storage registers of display 23. In either case, the printing can be done onto the original document 11; or an entirely new form including the edits can be printed, in which case the representation 22 of the original document 11 can be saved for later use as a master for later editing or mass production of forms 11.

Figure 3:
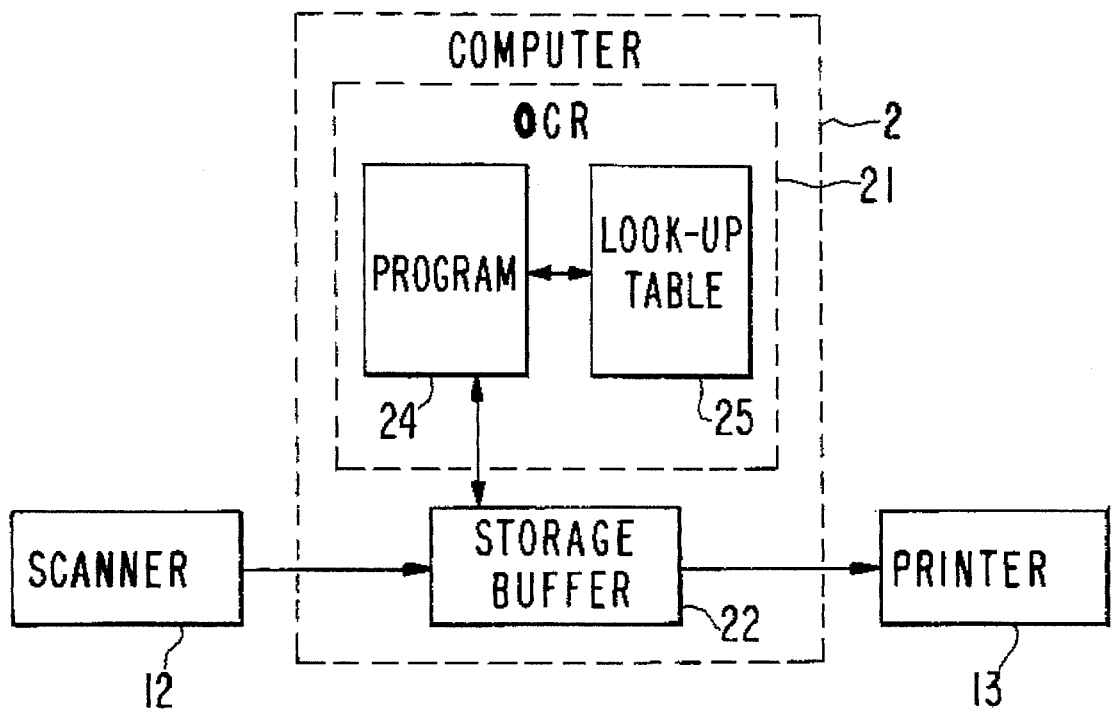
FIG. 3 is a block diagram of an embodiment of the present invention in which optical character recognizer (21) is used for editing and/or authentication.

As an example of an automatic editing means, FIG. 1 illustrates an optical character recognizer (OCR) 21 coupled to storage buffer 22. The operation of OCR 21 is illustrated in FIG. 3. A set of programmed instructions 24, which may be embodied in software, firmware, hardware, or some combination thereof, reads from storage buffer 22 the digital representation of the scanned document 11. Program 24 then compares this representation 22 with pre-stored cues that are stored within program 24 or within look-up table 25. When a match occurs, program 24 acts in a prearranged manner as defined by information contained within look-up table 25 to edit the representation 22 and restore the edited representation back into buffer 22, where it is subsequently printed onto document 11 by printer 13.

For example, the information scanned into buffer 22 may be a digital representation of the expression "name and address". When program 24 compares this representation from within buffer 22 with the identical representation from within itself or from table 25, it detects a match, automatically adds the name and address of the owner of computer 2 to the original representation after the expression "name and address", and resubmits the edited representation to buffer 22. Then when printer 13 prints this information onto the original document 11, the owner's name and address is automatically printed onto document 11 in the proper location.

Figure 2:
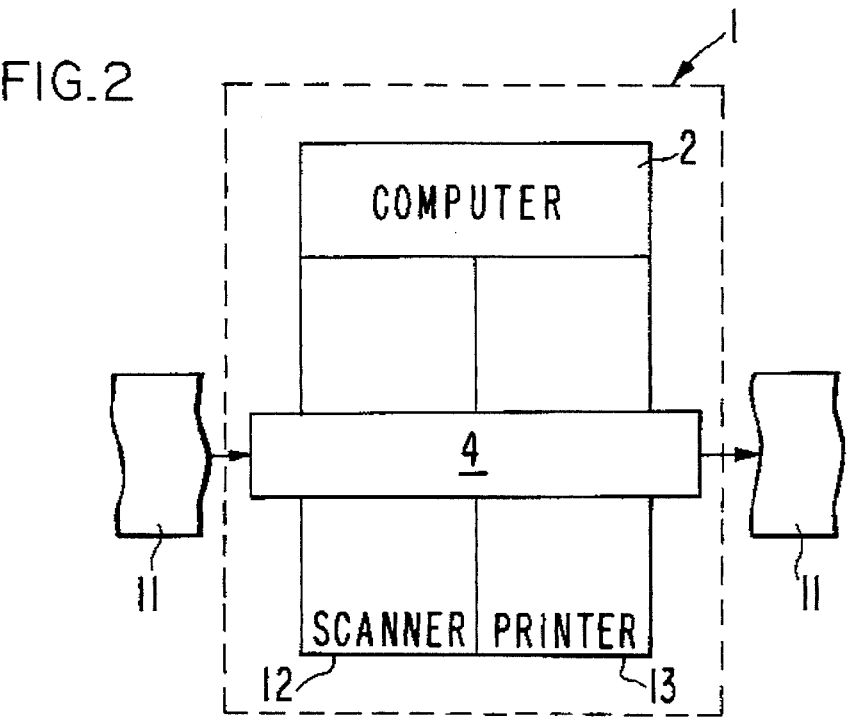
FIG. 2 is a simplified block diagram of the paper transport mechanism (4) of the present invention.

It is highly desirable for the scanner 12, computer 2, and printer 13 to reside within the same physical housing 1. This greatly facilitates the use of the apparatus. FIG. 2 shows how this is accomplished using a single paper transport mechanism 4, which physically transports document 11 through scanner 12 and printer 13. Computer 2 is coupled to each of scanner 12 and printer 13; all three of these components are within the same physical housing 1. It is preferable for the paper path actuated by paper transport mechanism 4 to be linear, to facilitate the registration of the edited information with respect to the original written, printed, digital, or graphical information that appears on document 11.

Figure 4:
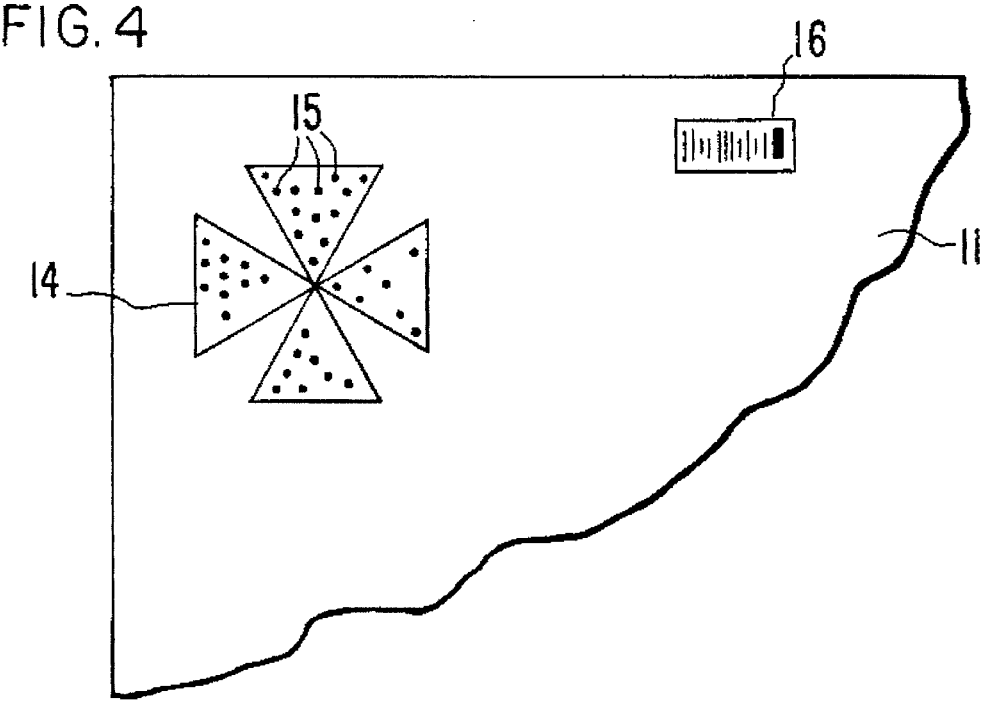
FIG. 4 is a magnified view of a portion of input document (11) showing an authentication code (14) superimposed thereon.

FIG. 4 illustrates an embodiment of the invention in which an authentication code 14 appears in graphical from on document 11. Code 14 is used for security purposes, e.g. to prevent unauthorized users from editing documents 11 by preventing the editing of documents 11 that have not been preauthorized by that particular computer 2. The authentication code can consist, just as one example, of a series of dots 15. The dots may be either visible or invisible to the naked eye. They may or may not be coded into a logo that appears on document 11. Dot factors which can be varied to create a unique code include color, placement, and density. The authentication code can replace handwritten signatures, stamps, chops, and embossers.

A typical manner in which the authentication works is as follows: an authentication code 14 is first devised by the operator of computer 2. It can be designed by the operator using input device 3 and display 23, or it can be generated by a random number generator within computer 2. In any event, a digital representation of this authentication code is stored within computer 2, e.g., within look-up table 25. A graphical representation of the same code 14 is printed onto document 11 by printer 13. In the case where the code 14 printed is invisible, it may be printed using pigments that are detectable in the infrared spectrum but not in the visible spectrum. In this embodiment, scanner 12 needs to be sensitive to infrared light. Alternatively, some other non-visible wavelength, such as ultraviolet, can be used.

Once the code 14 is printed on the document 11, document 11 becomes one which can be legally updated by that computer 2. This works as follows: document 11 is scanned into buffer 22 by scanner 12 as usual. Program 24 performs as a first step a comparison of the digital representation of that area of document 11 where code 14 is known to be with the digital representation of the authentication code 14 that is stored within look-up table 25. If a match occurs, program 24 relinquishes control to the normal editing process. If a match does not occur, however, program 24 inhibits the editing of the scanned information 22, and may cause input device 3 to lock out.

Rather than combining the authentication function with OCR 21 as described above, a separate authentication module, containing a program and a look-up table, can exist within computer 2.

The code that is printed on the document 11 can be modified when the document 11 is edited. This can signify that the document 11 should not be edited again. This result will be ensured because the digital representation of the code 14 printed on the document 11 will not be the same as the digital code in the look-up table 25.

In an alternative authentication scheme, the entire document 11 except for a relatively small preselected restricted region 16 is scanned by scanner 12. The scanned image data is translated by computer 2 by using a coding algorithm, which may include compression and/or sampling, into a unique code, which may be a digital number, that is then printed by printer 13 within the restricted region 16, e.g., as a bar code. Future authentication of document 11 is achieved by again scanning all but the restricted region 16 of document 11 by scanner 12 in the same fashion as before, and having computer 2 apply a coding algorithm (which may or may not be the original coding algorithm) to the new scanned image data, to produce a new code. Computer 2 then compares the new code with the original code 16. A match indicates that document 11 is authentic. If there is a mismatch, it indicates that document 11 has been modified.

In a variation of the above authentication scheme, the steps described in the above paragraph are carried out identically, through the step of printing the code onto the restricted region 16. However, the re-scanning is done differently. In this variation, document 11 is re-scanned by scanner 12 during the authentication phase, creating a second digital representation corresponding to the restricted region 16 and a third digital representation corresponding to unrestricted regions of the document 11 (the first digital representation was of the unrestricted regions from the original scan). Computer 2 then applies a decoding algorithm to the second digital representation to produce a fourth digital representation. Computer 2 then compares the fourth digital representation with the third digital representation. A match indicates an authentic document 11. A mismatch indicates a document 11 that has been modified. This authentication variation has the advantage that the password for the original coding algorithm does not have to be given to subsequent users who will be simply verifying the authenticity of document 11, thereby further enhancing security.

The above description is included to illustrate the operation of the preferred embodiments and is not meant to limit to scope of the invention. The scope of the invention is to be limited only by the following claims. From the above discussion, many variations will be apparent to one skilled in the art that would yet be encompassed by the spirit and scope of the invention.

What is claimed is:

1. A unified scanner computer printer, comprising:

means for optically scanning an entire input paper document into a storage buffer within a computer, thereby creating a scanned document within the storage buffer;

coupled to the storage buffer, means for selectively editing portions of the scanned document; and coupled to the computer, means for printing the edited portions of the scanned document onto the input paper document;

wherein the editing means comprises an optical character recognizer comprising:

programmed instructions means for recognizing digital representations of the scanned paper document within the storage buffer; and a look-up table accessible by the programmed instructions means; whereby the programmed instructions means includes means for comparing the digital representations with cues stored within the look-up table, and means for automatically editing the digital representations using information stored in the look-up table.

2. The apparatus of claim 1 wherein the editing means comprises:

a display in communicative relationship with the storage buffer; and human-activated input means in communicative relationship with the display.

3. The apparatus of claim 2 wherein the human-activated input means comprises a keyboard.

4. The apparatus of claim 2 wherein the human-activated input means comprises a mouse.

5. The apparatus of claim 2 wherein the human-activated input means comprises an electronic pen.

6. The apparatus of claim 1 wherein the input paper document is a preprinted form.

7. The apparatus of claim 1 wherein the scanner, computer, and printer all reside within a single housing.

8. The apparatus of claim 1 further comprising mechanical paper transport means for continuously transporting, along a single path, the input paper document from the scanning means to the printing means.

9. The apparatus of claim 8 wherein the single path is linear.

10. A unified scanner computer printer, comprising:

means for optically scanning an entire input paper document into a storage buffer within a computer, thereby creating a scanned document within the storage buffer;

coupled to the storage buffer, means for selectively editing portions of the scanned document; and coupled to the computer, means for printing the edited portions of the scanned document onto the input paper document;

wherein the input paper document contains an authentication code;

wherein the computer further comprises:

programmed authentication instructions means for recognizing a digital representation of the authentication code within the storage buffer; and an authentication look-up table accessible by the programmed authentication instructions means; whereby the programmed authentication instructions means includes means for examining the digital representation by comparing the digital representation with information contained within the authentication look-up table.

11. A unified scanner computer printer, comprising:

means for optically scanning an entire input paper document into a storage buffer within a computer, thereby creating a scanned document within the storage buffer;

coupled to the storage buffer, means for selectively editing portions of the scanned document; and coupled to the computer, means for printing the edited portions of the scanned document onto the input paper document;

wherein the input paper document contains an authentication code;

wherein the authentication code is constructed within a preselected region within the input paper document by:

using the scanning means to scan all of the document except for the preselected region, creating a digital representation;

using the computer to apply a coding algorithm to the digital representation to produce an authentication code; and using the printing means to print the authentication code onto the preselected region of the document.

12. A method for authenticating a document, comprising the steps of:

optically scanning all but a relatively small code portion of the document, using an optical scanner, to create a first digital representation;

applying a first coding algorithm to the first digital representation to produce a first code;

printing the first code onto the code portion;

subsequently re-scanning all but the code portion, using an optical scanner, to create a second digital representation;

applying a second coding algorithm to the second digital representation to produce a second code; and comparing the second code with the first code.

13. A method for authenticating a document, comprising the steps of:

optically scanning all but a relatively small code portion of the document using an optical scanner, to create a first digital representation;

applying a coding algorithm to the first digital representation to produce a code;

printing the code onto the code portion;

subsequently re-scanning the document using an optical scanner, to create a second digital representation corresponding to the code portion of the document and a third digital representation corresponding to remaining portions of the document;

applying a decoding algorithm to the second digital representation to produce a fourth digital representation; and comparing the fourth digital representation with the third digital representation.

14. The method of claim 12 wherein the first coding algorithm is substantially the same as the second coding algorithm.

\* \* \* \* \*